United States Patent [19]

Matsuoka

[11] Patent Number: 5,756,243
[45] Date of Patent: May 26, 1998

[54] METHOD FOR MANUFACTURING A MOLD HAVING AN EMBOSSED CAVITY SURFACE

[75] Inventor: Takeshi Matsuoka, Toyota, Japan

[73] Assignee: Toyota Jidosha Kabushiki Kaisha, Toyota, Japan

[21] Appl. No.: 812,313

[22] Filed: Mar. 5, 1997

[30] Foreign Application Priority Data

Mar. 26, 1996 [JP] Japan ................................. 8-068858

[51] Int. Cl.$^6$ ........................................................ B31F 1/07
[52] U.S. Cl. ................................. 430/30; 101/3.1; 216/9
[58] Field of Search .......................... 430/30, 310, 329; 216/9; 101/3.1

[56] References Cited

U.S. PATENT DOCUMENTS

| | | | |
|---|---|---|---|
| 4,321,105 | 3/1982 | Melonio et al. | 156/660 |
| 4,619,804 | 10/1986 | Leonard et al. | 264/220 |
| 5,256,360 | 10/1993 | Li | 264/219 |
| 5,480,763 | 1/1996 | Kondo et al. | 430/320 |

FOREIGN PATENT DOCUMENTS

| | | |
|---|---|---|
| 0311079A2 | 4/1989 | European Pat. Off. . |
| 0392519A2 | 10/1990 | European Pat. Off. . |
| 4219667A1 | 12/1993 | Germany . |
| 61-265207 | 11/1986 | Japan . |
| 62-144908 | 6/1987 | Japan . |
| 63-151409 | 6/1988 | Japan . |
| 63-297006 | 12/1988 | Japan . |
| 3-138032 | 6/1991 | Japan . |
| 4-228231 | 8/1992 | Japan . |
| 5-212727 | 8/1993 | Japan . |

*Primary Examiner*—Christopher G. Young
*Attorney, Agent, or Firm*—Burns, Doane, Swecker & Mathis, LLP

[57] ABSTRACT

A method for manufacturing a mold includes the steps of machining at least a portion of a cavity surface at a controlled roughness, and embossing the machined portion of the cavity surface with a specified embossment having a specified depth, wherein the ratio of the roughness to the depth of the embossment is controlled to be at a particular value. The value is smaller than 0.6, and preferably is about 0.2.

19 Claims, 2 Drawing Sheets

METHOD FOR MANUFACTURING A MOLD HAVING AN EMBOSSED CAVITY SURFACE

FIELD OF THE INVENTION

The present invention generally relates to a method of manufacturing a mold and more particularly concerns a method of manufacturing a mold used for embossing.

BACKGROUND OF THE INVENTION

A conventional mold used for embossing (transferring a pattern formed in a surface of a mold to the surface of a product molded in the mold, used, for example, when transferring a pattern of a mold to a plastic product) is manufactured by machining a cavity surface (product forming surface) of the mold. This can be done by applying milling or electric discharge machining to the surface, grinding the machined cavity surface, and finally embossing an embossment pattern into the ground surface.

In the milling step, a ball end mill with a tip having a semispherical configuration is used and a pick feed of 1.0–2.0 mm is selected. The surface of the mold is then machined to a roughness of 15–40 μm. A portion of the mold where the space is too narrow to receive the end mill or where the depth is too deep for the tip of the end mill to reach is machined by electric discharge machining. During electric discharge machining, the electric discharge energy per electric discharge is selected so that the same order of surface roughness as that of milling (the roughness of 15–40 μm) is obtained.

During the grinding step, the machined surface is ground by means of a grindstone or a grindpaper, manually or using a robot, to be smaller than 3–5 μm in roughness.

During the embossing step, although the depth of the embossment varies slightly according to the pattern of the embossment, the depth of the embossment is usually 20–130 μm. The ground cavity surface of the mold is cleaned, is coated with an acid-proof photosensitive film, and is then attached to a film on which an embossment pattern is drawn. Then, the surface is exposed to light and is developed so that only the portion of the acid-proof photosensitive film exposed to light is solidified. Then, using an acid liquid, only the portion of the ground cavity surface corresponding to a non-solidified portion of the acid-proof photosensitive film is corroded so that the surface of the mold is embossed.

However, in the conventional method for manufacturing an embossing mold, grinding is necessarily conducted, and much time and work is spent carrying out this grinding step. Further, because the optimum surface roughness for machining is not given, the roughness will be too coarse or too fine. In this instance, an excessively coarse roughness would make the grinding time period too long, and an excessively fine roughness would make the machining time period too long.

SUMMARY OF THE INVENTION

In light of the foregoing, a need exists for a method for manufacturing a mold which can eliminate grinding and optimize the roughness for machining the cavity surface.

A method according to the present invention involves a way of manufacturing a mold having a cavity surface at least a portion of which is embossed. The method includes the steps of machining the portion of the cavity surface at a controlled roughness, and embossing the machined portion of the cavity surface with a specified embossment having a specified depth, wherein the ratio of the roughness to the depth of the embossment is controlled so as to be at a particular value.

In the above-described method, since the roughness during the machining is controlled at less than a predetermined roughness according to the embossment depth, grinding can be eliminated, almost preventing the roughness of the machining from remaining on the embossed surface. Due to this elimination of the grinding step, much time and work which has previously been required for grinding is removed.

BRIEF DESCRIPTION OF THE DRAWING FIGURES

The above and other objects, features, and advantages of the present invention will become more apparent and will be more readily appreciated from the following detailed description of the preferred embodiments of the present invention considered in conjunction with the accompanying drawing figures, in which like elements bear like reference numerals and wherein.

DETAILED DESCRIPTION OF THE PREFERRED EMBODIMENT

As discussed above, other known methods of manufacturing a mold involve a grinding step. There are several reasons why grinding was perceived to be a necessary step in the manufacture of a mold used for embossing:

First, it has been perceived that the roughness required to emboss cannot be satisfied by the roughness obtained during machining only.

Second, it has been believed that a step in the configuration which may be caused between the surface machined through milling and the surface machined through electric discharge machining can only be removed by grinding.

Third, it has been perceived that when a relatively deep scratch is generated during machining, the scratch can only be removed by grinding.

In developing the method according to the present invention, countermeasures were discovered to address the aforementioned three points, thus raising the thought that it would be possible to eliminate grinding from the mold manufacturing steps. More particularly, with respect to the first concern mentioned above, since the embossment depth is usually 20–130 μm and is relatively greater than the surface roughness (15 μm) usually obtained during machining, it has been found that it would cause no problem from the standpoint of appearance if the roughness of the machining remains in the embossed surface. Concerning the second mentioned above, by adopting an all numerical control machining, a step in the configuration would not be generated in the machined surface. Regarding the third concern discussed above, by controlling the rotational speed to be high and the milling depth to be shallow during milling, the quality of the machined surface can be made high and stable.

In order to eliminate grinding in developing the present invention, it has been discovered that the roughness of machining a portion of the cavity surface of the mold should be controlled according to the depth of the embossment to be formed in that portion of the cavity surface of the mold, that is, on the basis of embossment depth. The reason is because if the roughness of the machined surface is too large relative to the depth of that specified embossment, the roughness of the machined surface would remain on the embossed surface and would be transferred to the product surface. In this instance, it is to be noted that the ratio of the roughness of the machined surface to the embossment depth varies according to the appearance quality required on respective resin products. More particularly, in the case of automobile parts, the ratio should be a small value for the upper surface of a grill and an instrument panel because the appearance quality required in these areas is high, while the ratio may be a large value for the lower surface of a bumper and a scuff plate because the appearance quality for these areas is low.

Figure 2:
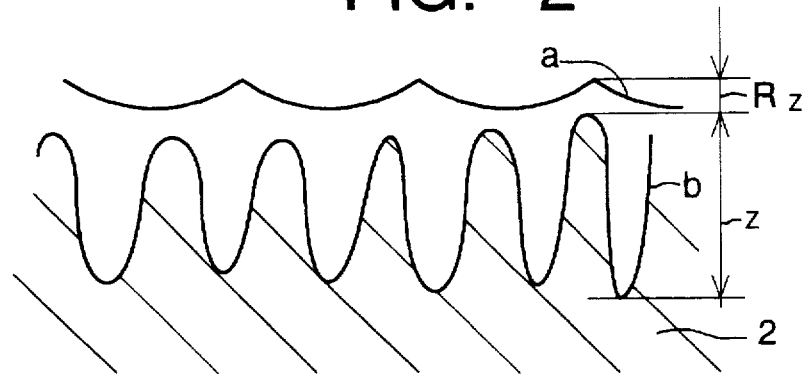
FIG. 2 is a cross-sectional view of the cavity surface of the mold illustrating the dimensional relationship between the machined surface and the depth of the embossment.

FIG. 2 illustrates the relationship between the roughness ($R_z$) of a portion of the cavity surface a of a mold 2 and a depth (z) of an embossment b. From various tests conducted for developing the present invention, the ratio of the roughness ($R_z$) to the embossment depth (z) is set at a particular value less than 0.6, more preferably in the range of 0.1–0.3 and most preferably at about 0.2. Therefore, the roughness ($R_z$) during machining is controlled at the value calculated by the following equation:

Roughness ($R_z$)=Embossment depth (z)×0.2

The reason for using a ratio less than 0.6 is that if the ratio is at 0.6, the roughness of the machined surface slightly remains on the embossed surface and is slightly transferred to the surface of the resin product, but the remaining roughness is in an allowable range from the appearance viewpoint in the case of products in which the appearance quality required is low, and if the ratio is greater than 0.6, the appearance quality exceeds the allowable limit. The reason for preferably using a ratio of about 0.2 is that the transfer of the machining roughness remaining on the embossed surface of the cavity surface to resin products is no longer recognizable and therefore the embossing can be used in the case of the products in which the appearance quality required is high. Although the lower the ratio, the higher the appearance quality, if the ratio is too small, a period of time required in machining (which may be milling or electric discharge machining) will be long. Therefore, the ratio should be at least equal to or greater than 0.1.

In the method for manufacturing a mold according to the present invention, at least a portion of a cavity surface of a mold is first machined by milling and/or electric discharge machining, and then the machined portion of the cavity surface of the mold is embossed directly, i.e., without grinding before embossing. In order to eliminate the grinding operation, during machining of the portion of the cavity surface of the mold, the roughness of the machining is controlled according to the depth of the embossment to be formed on that surface. The control of the roughness of machining can be conducted in the following manner.

Figure 3:
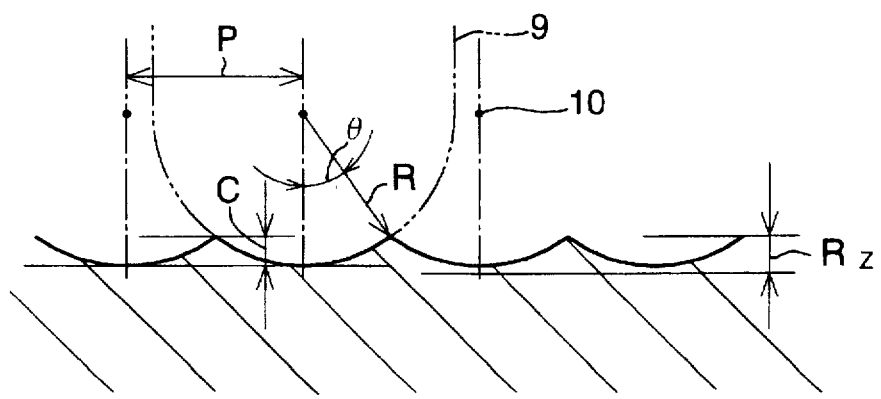
FIG. 3 is a cross-sectional view of the cavity surface illustrating the dimensional relationship between the roughness of the cavity surface and a ball end mill and its pick feed used during milling.

In the case where the machining is milling through use of a ball end mill with a tool 9 having a semispherical tip as illustrated in FIG. 3, the roughness ($R_z$) of the machining is determined by the following equation:

$$R_z = C + (d^2 + s^2 + x^2 + y^2 + z_1^2)^{1/2}$$

where, $R_z$: roughness of machining d: data tolerance (tolerance of NC data)

s: the minimum setting value for the data x: the machine accuracy in an x-direction including a backlash of a gear, etc.

y: the machine accuracy in a y-direction including a backlash of a gear, etc.

$z_1$: the machine accuracy in a z-direction including a backlash of a gear, etc.

C: the quantity determined from the following equation (see FIG. 3):

$$C = R - R \cdot \cos\theta$$
$$\theta = \sin^{-1}(P/2R)$$

where,

R: a radius of the tip of the ball end mill

P: a pick feed (see FIG. 3)

By selecting the radius R of the tool 9 and the pick feed P of the data 10, quantity C can be controlled, and by controlling the quantity C, roughness $R_z$ can be adjusted. Therefore, when the embossment depth z is specified or given, the values of R and P are selected so that the roughness $R_z$ is at least less than 0.6, more preferably, about 0.2.

Figure 4:
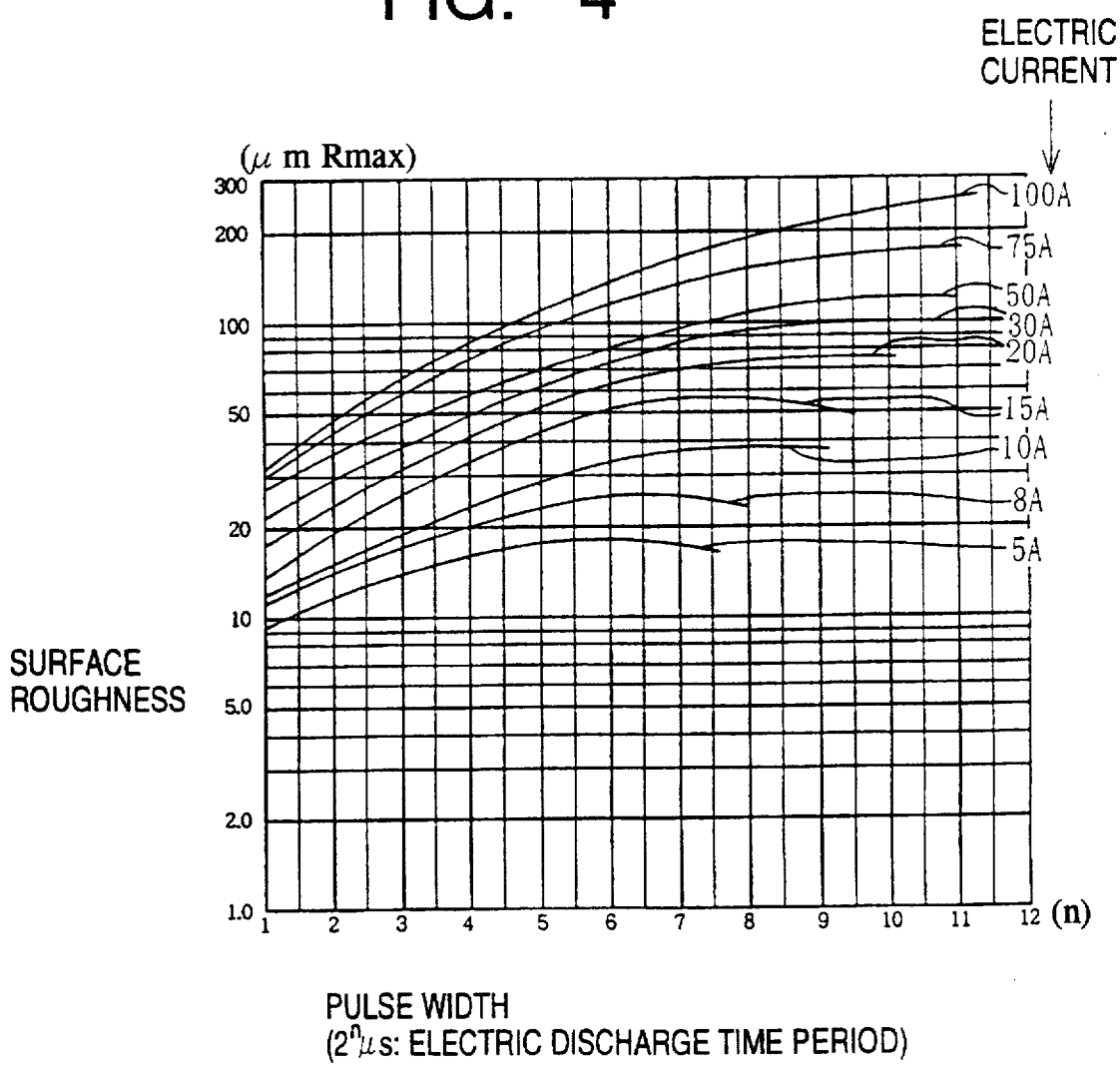
FIG. 4 is a graph illustrating the relationship between the roughness of the cavity surface and the electric discharge energy during electric discharge machining.

In the case where the machining is electric discharge machining, as illustrated in FIG. 4, since a correlation exists between the surface roughness ($R_z$) and the electric discharge energy (an electric current×a pulse width), it is possible to control the value of the surface roughness ($R_z$) by selecting the electric discharge energy. In this instance, the lower the electric discharge energy, the smaller the surface roughness ($R_z$).

For example, in a case where a surface roughness of 25 μm was required to an embossment depth of 0.2 mm, in the tests of FIG. 4, the surface roughness of 25 μm could be obtained by selecting an electric current of 10 A and a pulse width of 4, or selecting an electric current of 8 A and a pulse width of 5–6. In the tests of FIG. 4, the material of the electrode was copper, the material of the mold was steel, the polarity of the electrode was anode, the servo voltage was 0 V, the pressure of the liquid used in the electric discharge machining was 0.1–0.2 kg/cm², and the duty factor was 50%. The electric current was changed from 5 A to 100 A.

As discussed above, the surface roughness of less than 0.6×z, more preferably about 0.2×z, is obtained in milling machining or electric discharge machining, so that embossing can be applied to the machined surface without applying grinding before embossing.

Embossing is conducted in the same way as conventional embossing. More particularly, the machined surface of the mold is cleaned, then is coated with an acid-proof photosensitive film, and then is applied with a film on which an embossment pattern is drawn. Then, the surface is exposed to light and is developed so that only the portion of the acid-proof photosensitive film exposed to light is solidified. Then, using an acid liquid, only the portion of the ground cavity surface corresponding to a non-solidified portion of the acid-proof photosensitive film is corroded so that the surface of the mold is embossed.

Figure 1:
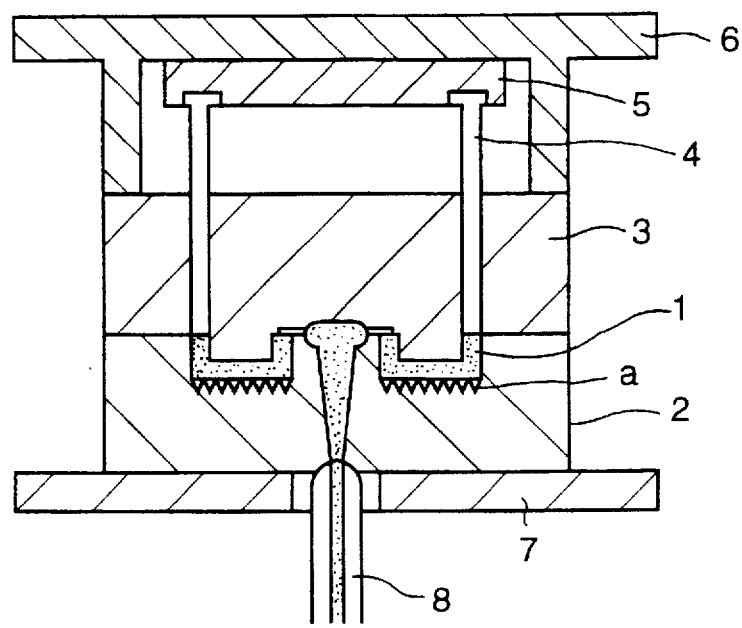
FIG. 1 is a cross-sectional view of a molding apparatus having a mold manufactured according to the method of the present invention.

As illustrated in FIG. 1, the manufactured mold 2 is set in the molding apparatus and defines a cavity between the mold 2 and the core mold 3. The mold 2 is coupled to a lower plate 7 and the core mold 3 is coupled to an upper plate 6. A molten resin is injected from the injection nozzle 8 into the cavity. When the molten resin is cooled and solidified, the resin provides a plastic product 1. The embossment pattern of the embossed surface a is transferred to the surface of the plastic product 1. When the molds 2 and 3 are open, the product 1 is pushed out from the molding apparatus through operation of an ejecting pin 4 which is pushed from an ejecting plate 5.

In the method for manufacturing a mold according to the present invention, since the grinding step is eliminated, the number of manufacturing steps is decreased resulting in a reducing in cost. Though a plastic product having its thickness increased by 5–10% due to the recess of the surface associated with grinding was manufactured using the conventional mold, a plastic product having an exact specified thickness is manufactured using the mold manufactured by the method according to the present invention.

According to the present invention, the following technical advantages are obtained.

First, since the ratio of the roughness of the machining to the depth of the embossment is controlled so as to be at a particular value, the grinding operation can be eliminated from the mold manufacturing process, thereby preventing the roughness due to machining from remaining in significant respects on the embossed surface of the mold.

Additionally, since the grinding step is eliminated, much time and work can be avoided.

Also, when the ratio of the roughness of the machining to the depth of the embossment is selected to be equal to or less than 0.6, the transfer of the roughness of the machining remaining on the embossed surface to the product is substantially prevented.

Further, when the ratio is selected to be about 0.2, the transfer of the roughness of machining remaining on the embossed surface to the product is almost unrecognizable.

Moreover, since the ratio is selected to be equal to or greater than 0.1, increases in the time for machining is maintained at an allowable level.

Also, when milling machining is used, the surface roughness can be controlled by selecting the radius of the milling tool and the pick feed.

Lastly, when the machining that is used is electric discharge machining, the surface roughness can be controlled by selecting the magnitude of the electric discharge energy.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A method for manufacturing a mold having a cavity surface which is at least embossed, comprising the steps of:

machining a portion of the cavity surface at a roughness having a first depth; and embossing said portion of said cavity surface with an embossment having a second depth, a ratio of the first depth of the roughness of the cavity surface to the second depth of said embossment being controlled to be equal to or less than 0.6.

2. A method according to claim 1, wherein said embossing is conducted without grinding said portion of said cavity surface.

3. A method according to claim 1, wherein the ratio of the first depth of the roughness of the cavity surface to the second depth of said embossment is controlled to be equal to or greater than 0.1.

4. A method according to claim 1, wherein the ratio of the first depth of the roughness of the cavity surface to the second depth of said embossment is controlled to be about 0.2.

5. A method according to claim 1, wherein said machining is milling.

6. A method according to claim 5, wherein said roughness is obtained by selecting a radius of a tip of a ball end mill and a pick feed.

7. A method according to claim 1, wherein said machining is electric discharge machining.

8. A method according to claim 7, wherein said roughness is obtained by selecting an electric discharge energy.

9. A method for manufacturing a mold having a cavity surface which is embossed, comprising the steps of:

machining a portion of the cavity surface at a roughness having a first depth; and embossing said portion of said cavity surface with an embossment having a second depth, said embossing being performed in the absence of grinding between the machining and the embossing of said portion of said cavity surface.

10. A method according to claim 9, wherein said machining is milling.

11. A method according to claim 10, wherein said embossing is obtained by selecting a radius of a tip of a ball end mill and a pick feed.

12. A method according to claim 9, wherein said machining is electric discharge machining.

13. A method according to claim 12, wherein the roughness of the cavity surface is obtained by selecting an electric discharge energy.

14. A method according to claim 9, wherein a ratio of the first depth of the roughness of the cavity surface to the second depth of the embossment is controlled to be equal to or smaller than 0.6.

15. A method according to claim 9, wherein a ratio of the first depth of the roughness of the cavity surface to the second depth of the embossment is controlled to be equal to or greater than 0.1.

16. A method according to claim 9, wherein a ratio of the first depth of the roughness of the cavity surface to the second depth of the embossment is controlled to be about 0.2.

17. A method for manufacturing a mold having a cavity surface which is embossed, comprising the steps of:

machining a portion of the cavity surface at a roughness having a first depth; and embossing said portion of said cavity surface with an embossment having a second depth, a ratio of the first depth of the roughness of the cavity surface to the second depth of said embossment being controlled to be equal to or less than 0.6 and greater than or equal to 0.1, said embossing being performed in the absence of grinding between the machining and the embossing of said portion of said cavity surface.

18. A method according to claim 17, wherein said machining is milling.

19. A method according to claim 17, wherein said machining is electric discharge machining.

* * * * *